UNITED STATES PATENT OFFICE.

EDWARD D. KENDALL, OF ELIZABETH, NEW JERSEY, ASSIGNOR OF ONE-THIRD TO LOUIS T. HAGGIN, OF CLOSTER, NEW JERSEY, AND MARGARET V. HAGGIN, ALLAN McCULLOH, AND H. ESK. MOLLER, OF NEW YORK, N. Y., AS EXECUTORS OF JAMES B. HAGGIN, DECEASED.

COMPOSITION OF MATTER FOR ADAPTING CARBON RESIDUES FROM THE DISTILLATION OF PETROLEUM FOR USE IN SMELTING-FURNACES.

1,236,447.     Specification of Letters Patent.     Patented Aug. 14, 1917.

No Drawing.     Application filed July 26, 1912. Serial No. 711,720.

*To all whom it may concern:*

Be it known that I, EDWARD D. KENDALL, a citizen of the United States, residing at Elizabeth, in the county of Union and State of New Jersey, have invented a new and useful Composition of Matter for Adapting Carbon Residues from the Distillation of Petroleum for Use in Smelting-Furnaces, of which invention the following is a specification.

This invention relates to processes for briqueting soft or friable carbonaceous fuel and has for its object the rendering of the carbon-residues from the distillation of petroleum available in the smelting of ores of metals, particularly the ores of iron.

In operations of smelting large bodies of ores of iron, in the well-known large smelting furnaces, it is necessary that the fuel employed shall have sufficient strength or rigidity to resist the crushing pressure of the superincumbent mass consisting of ore or ores of iron, flux or slag-forming materials and solid fuel; it is also necessary that no substance shall be added to the ore, flux, or fuel that can interfere with the chemical reduction of the ore and the fluidity of suitable flux or slag, or that will not assimilate with suitable flux and flow out of the furnace as a part of the fluid slag.

My improvement consists in imparting strength or rigidity to the said carbon-residues from petroleum by means of a composition containing the constituents of a suitable flux or slag-forming composition of matter but containing a greater proportion of lime than the fluxes usually employed.

The fluxes of blast-furnaces consist chiefly of silica, lime and alumina and the proportions of these bodies vary with different methods of operating, different localities and, particularly, with the different ores of iron which may be of silicious, calcareous or argillaceous character or mixtures of such ores; these fluxes may contain twenty to seventy per cent. of silica, or ten to sixty per cent. of lime, or six to thirty per cent. of alumina. My improvement consists in briqueting the said carbon-residues with a suitable cement made with silicious, calcareous and argillaceous bodies, and having the binding character of Portland cement or of pozzolana, this cementing material being composed chiefly, like the above described fluxes, of silica, lime and alumina, but, containing a smaller percentage of silica and therefore an excessive proportion of lime so that the cement shall be less fusible than the said fluxes until brought in contact with an additional supply of silica provided by using a highly silicious flux or derived from a silicious ore.

Such a cement may be of the character of Portland cement prepared with much lime, or it may be of natural rock-cement to which natural rock a sufficient amount of lime and alumina has been added, or, it may be prepared from blast-furnace slag, granulated by conducting the melted slag into water and then grinding the disintegrated slag with from ten to thirty per cent. of its weight of freshly burned lime, or a proportionately greater weight of slaked lime. The cement is to be mechanically incorporated with the said carbon-residues, adding water as required, and using a sufficient amount of cement to bind the carbon and hold the same in any forms given to the mixed cement and carbon by passing the mixture through any of the suitable and well-known briqueting machines. The products from the briqueting machines may be allowed to dry spontaneously, or, after the setting or solidification of the cement, may be dried by any of the well-known methods of drying by hot air, or may be dried in kilns.

What I claim is:—

A composition of matter for adapting carbon-residues from the distillation of petroleum for use in smelting furnaces and consisting of the crushed said carbon-residues with suitable cement composed of silica, lime and alumina and with freshly burned lime, this composition being briqueted, with the aid of water in any of the well-known forms of briqueting machines suitable for the purpose.

EDWARD D. KENDALL.

Witnesses:
 STUART J. LEBACH,
 A. T. SCHARPS.